US009978013B2

(12) United States Patent
Kaufhold (10) Patent No.: US 9,978,013 B2
(45) Date of Patent: May 22, 2018

(54) SYSTEMS AND METHODS FOR RECOGNIZING OBJECTS IN RADAR IMAGERY

(71) Applicant: Deep Learning Analytics, LLC, Arlington, VA (US)

(72) Inventor: John Patrick Kaufhold, Arlington, VA (US)

(73) Assignee: Deep Learning Analytics, LLC, Arlingon, VA (US)

( * ) Notice: Subject to any disclaimer, the term of this patent is extended or adjusted under 35 U.S.C. 154(b) by 326 days.

(21) Appl. No.: 14/794,376

(22) Filed: Jul. 8, 2015

(65) Prior Publication Data

US 2016/0019458 A1    Jan. 21, 2016

Related U.S. Application Data

(60) Provisional application No. 62/025,075, filed on Jul. 16, 2014.

(51) Int. Cl.
    *G01S 13/90* (2006.01)
    *G06N 3/04* (2006.01)
    *G01S 7/41* (2006.01)

(52) U.S. Cl.
    CPC ............ *G06N 3/0454* (2013.01); *G01S 7/417* (2013.01); *G01S 13/90* (2013.01); *G01S 13/9035* (2013.01)

(58) Field of Classification Search
    CPC ...... G01S 13/90; G01S 7/417; G01S 13/9035; G06N 3/0454

(Continued)

(56) References Cited

U.S. PATENT DOCUMENTS

| 7,587,064 B2 * | 9/2009 | Owechko ............... G06K 9/469 382/103 |
| 2008/0243383 A1 * | 10/2008 | Lin ...................... G01C 21/165 701/469 |

(Continued)

OTHER PUBLICATIONS

T. D. Ross, S. W. Worrell, V. J. Velten, J. C. Mossing, and M. L. Bryant, "Standard SAR AIR evaluation experiments using the MSTAR public release data set," in Aerospace/Defense Sensing and Controls, 1998, pp. 566-573.

(Continued)

*Primary Examiner* — Timothy A Brainard
(74) *Attorney, Agent, or Firm* — Clyde E. Findley (57) ABSTRACT

The present invention is directed to systems and methods for detecting objects in a radar image stream. Embodiments of the invention can receive a data stream from radar sensors and use a deep neural network to convert the received data stream into a set of semantic labels, where each semantic label corresponds to an object in the radar data stream that the deep neural network has identified. Processing units running the deep neural network may be collocated onboard an airborne vehicle along with the radar sensor(s). The processing units can be configured with powerful, high-speed graphics processing units or field-programmable gate arrays that are low in size, weight, and power requirements. Embodiments of the invention are also directed to providing innovative advances to object recognition training systems that utilize a detector and an object recognition cascade to analyze radar image streams in real time. The object recognition cascade can comprise at least one recognizer that receives a non-background stream of image patches from a detector and automatically assigns one or more semantic labels to each non-background image patch. In some embodiments, a separate recognizer for the background analysis of patches may also be incorporated. There may be (Continued)

multiple detectors and multiple recognizers, depending on the design of the cascade. Embodiments of the invention also include novel methods to tailor deep neural network algorithms to successfully process radar imagery, utilizing techniques such as normalization, sampling, data augmentation, foveation, cascade architectures, and label harmonization.

1 Claim, 5 Drawing Sheets (58) Field of Classification Search
USPC .......................................................... 342/25 F
See application file for complete search history.

(56) References Cited

U.S. PATENT DOCUMENTS

| | | | | |
|---|---|---|---|---|
| 2010/0103029 A1* | 4/2010 | Khatwa | ...................... | G01S 7/22 342/26 B |
| 2010/0109938 A1* | 5/2010 | Oswald | .................. | G01S 7/2926 342/90 |
| 2011/0029471 A1* | 2/2011 | Chakradhar | ............ | G06N 3/063 706/25 |
| 2013/0343641 A1* | 12/2013 | Mnih | .................... | G06K 9/6269 382/156 |
| 2014/0293091 A1* | 10/2014 | Rhoads | ................... | G01J 3/513 348/234 |

OTHER PUBLICATIONS

J. C. Mossing and T. D. Ross; "Evaluation of SAR ATR algorithm performance sensitivity to MSTAR extended 1 operating conditions," in Aerospace/Defense Sensing and Controls , 1998, pp. 554-565.
T. D. Ross, J. J. Bradley, L. J. Hudson, and M. P. O'Connor, "SAR ATR: so what's the problem? An MSTAR perspective," in AeroSense'99 , 1999; pp. 662-672.
A. B. Muccio and T. B. Scruggs, "Moving Target Indicator (MTI) Applications for Unmanned Aerial Vehicles (UAVS)," in Radar Conference, 2003. Proceedings of the International , 2003, pp. 541-546.
J. P. How, C. Fraser, K. C. Kulling, L. F. Bertuccelli, O. Toupet, L. Brunet, A. Bachrach, and N. Roy, "Increasing autonomy of UAVs," Robot. Autom. Mag. IEEE, vol. 16, No. 2, pp. 43-51, 2009.
Y. LeCun, F. J. Huang, and L. Bottou, "Learning methods for generic object recognition with invariance to pose and lighting," in Computer Vision and Pattern Recognition, 2004. CVPR 2004. Proceedings of the 2004 IEEE Computer I Society Conference on, 2004, vol. 2, pp. II-97.
A. Krizhevsky, I. Sutskever, and G. Hinton, "imagenet classification with deep convolutional neural networks," In Advances in Neural Information Processing Systems 25 , 2012. pp. 1106-1114.
L. Deng, G. Hinton, and B. Kingsbury, "New types of deep neural network learning for speech recognition and related applications: An overview," in Proc. ICASSP , 2013.
A.-R. Mohamed, T. N. Sainath, G. Dahl, B. Ramahhadran, G. E. Hinton, and M. A. Picheny, "Deep belief networks using discriminative features for phone recognition," in Acoustics, Speech and Signal Processing (ICASSP), 2011 IEEE International Conference on, 2011, pp. 5060-5063.
D. Ciresan, A. Giusti, and J. Schmidhuber, "Deep neural networks segment neuronal membranes in electron micioscopy images," in Advances in Neural Information Processing Systems 25, 2012, pp. 2852-2860.
D. Ciresan, U. Meier, and J. Schmidhuber, "Multi-column deep neural networks for image classification," in Computer Vision and Pattern Recognition (CVPR), 2012 IEEE Conference on, 2012, pp. 3642-3649.

J. Ngiarn, A. Khosla, M. Kim, J. Nam, H. Lee, and A. Ng, "Multimodal deep learning," in Proceedings of the 28th International Conference on Machine Learning (ICML-11) , 2011, pp. 689-696.
D. M. Blei, T. L. Griffiths, and M. I. Jordan, "The nested chinese restaurant process and bayesian nonparametric inference of topic hierarchies," J. ACM JACM , vol. 57, No. 2, p. 7, 2010.
J. Paisley, C. Wang, D. M. Biel, and M. I. Jordan, "Nested hierarchical Dirichlet Processes," ArXiv Prepr. ArXiv1210.6738v4, May 2, 2014.
G. E. Hinton, "Training products of experts by minimizing contrastive divergence," Neural Comput., vol. 14, No. 8, pp. 11771-1800, 2002.
G. E. Hinton and R. R. Salakhutdinov, "Reducing the dimensionality of data with neural networks," Science, vol. 313, No. 5786, pp. 504-507,2006.
R. Salakhutdinov, A. Mnih, and G. Hinton, "Restricted Boltzmann machines for collaborative filtering," In Proceedings of the 24th international conference on Machine learning , 2007, pp. 791-798.
M. Ranzato, F. J. Huang, Y.-L. Boureau, and Y. Lecun, "Unsupervised learning of invariant feature hierarchies with applications to object recognition," in Computer Vision and Pattern Recognition, 2007. CVPR'07. IEEE Conference on , 2007, pp. 1-8.
P. Vincent, H. Larochelle, I. Lajoie, Y. Bengio, and P.-A. Manzagol, "Stacked denoising autoencoders: Learning useful representations in a deep network with a local denoising criterion," J. Mach. Learn, Res. , vol. 9999, pp. 3371-3408, 2010.
G. E. Hinton, N. Srivastava, A. Krizhevsky, I. Sutskever, and R. R. Salakhutdinov, "Improving neural networks by preventing co-adaptation of feature detectors," ArXiv Prepr. ArXiv1207.0580v1 , 2012.
G. E. Dahl, T. N. Sainath, and G. E. Hinton, "Improving Deep Neural Networks for LVCSR using Rectified Linear Units and Dropout," in Proc, ICASSP , 2013.
"ImageNet Large Scale Visual Recognition Competition 2012 (ILSVRC2012)." [Online]. Available: http://www.Image-net.org/challenges/LSVRC/2012/results.html.
S. Suvorova and J. Schroeder, "Automated Target Recognition Using the Karhunen—Loéve Transform with Invariance," Digit. Signal Process. , vol. 12, No. 2, pp. 295-306, 2002.
T. D. Ross and L. C. Goodwon, "Improved automatic target recognition (ATR) value through enhancements and accommodations," in Defense and Security Symposium ; 2006; p. 62370T-62370T.
X. Yu, Y. Li, and L. C. Jiao, "SAR automatic target recognition based on classifiers fusion," in Multi-Platform/Multi-Sensor Remote Sensing Mapping (M2RSM), 2011 International Workshop 2011, 1-5.
"GeForce GTX 580 | Specifications | GeForce." [Online]. Available: http://www.geforce.com/hardware/desktop-gpus/geforce-gtx-580/specifications.
"GeForce GTX 780 | Specifications | GeForce." [Online]. Available: http://www.geforce.com/hardware/desktop-gpus/geforce-gtx-780/specifications.
"Parallel Programming and Computing Platform | CUDA | NVIDIA | NVIDIA." [Online]. Available: http://www.nvidia.com/object/cuda_home_new.htmi.
"Cuda-convnet—High-performance C++/CUDA implementation of convolutional neural networks—Google Project Hosting." [Online]. Available : http://code.google.com/p/cuda-convnet/.
G. E. Hinton and R. S. Zemel, "Autoencoders, minimum description length, and Helmholtz free energy," Adv. Neural Inf. Process. Syst. , pp. 3-3, 1994.
P. Vincent, H. Larochelle, Y. Bengio, and P.-A. Manzagol, "Extracting and composing robust features with denoising autoencoders," in Proceedings of the 25th international conference on Machine learning, 2008, pp. 1096-1103.
G. E. Hinton, P. Dayan, and M. Revow, "Modeling the manifolds of images of handwritten digits," Neural Netw. IEEE Trans. On , vol. 8, No. 1, pp. 65-74, 1997.
R. Salakhutdinov and G. Hinton, "Semantic hashing," Int. J. Approx. Reason. , vol. 50, No. 7, pp. 969-978, 2009.

(56) References Cited

OTHER PUBLICATIONS

R. Salakhutdinov and G. E. Hinton, "Deep boltzmann machines," in International Conference on Artificial Intelligence and Statistics, 2009, pp. 448-455.

D. Erhan, P.-A. Manzagol, Y. Bengio, S. Bengio, and P. Vincent, "The difficulty of training deep architectures and the effect of unsupervised pre-training," in International Conference on Artificial Intelligence and Statistics , 2009, pp. 153-160.

D. Erhan, Y. Bengio, A. Courville, P.-A. Manzagoi, P. Vincent, and S. Benglo, "Why does unsupervised pre-training help deep learning?," J. Mach. Learn, Res., 11, 625-660,2010.

B. M. Lake, R. Salakhutdirlov, J. Gross, and J. B. Tenenbaum, "One shot learning of simple visual concepts," in Proceedings of the 33rd Annual Conference of the Cognitive Science Society , 2011.

R. Salakhutdinov, A. Torralba, and J. Tenenbaum, "Learning to share visual appearance for multiclass object detection," in Computer Vision and Pattern Recognition (CVPR), 2011 IEEE Conference on, 2011, pp. 1481-1488.

"Yann LeCun—Google+ - +Alex Krizhevsky's talk at the ImageNet ECCV workshop . . . " [Online]. Available: https://plus.google.com/104362980539466846301/post/JBBFfv2XgWM.

S. Bengio, L. Deng, H. Larochelle, H. Lee, and R. Salakhutdinov, "Guest Editors' Introduction: Special Section on Learning Deep Architectures." IEEE Transactions on Pattern Analysis and Machine Intelligence, vol. 35. No. 8, Aug. 2013.

"Google Hires Brains that Helped Supercharge Machine Learning | Wired Enterprise | Wred.com." [Online]. Available: http://www.wired.com/wiredenterprise/2013/03/google_hinton/.

"Facebook is working on 'deep learning' neural networks to learn even more about your personal life | ExtremeTech."[Online]. Available: http://www.extremetech.com/computing/167179-facebook-is-working-on-deep-learning-neural-net works-to-learn-even-more-about-your-personal-life.

"Facebook's 'Deep Learning' Guru Reveals the Future of AI | Wired.com," Wired Enterprise. [Online]. Available: http://www.wired.com/wiredenterprise/2013/12/facebook-yann-lecun-qa/.

"New Techniques from Google and Ray Kurzweil Are Taking Artificial Intelligence to Another Level | MIT Technology Review." Available: http://www.technologyreview.com/featuredstory/513696/deep-learning/.

"Texas Advanced Computing Center—Stampede." [Online]. Available: http://www.tacc.utexas.edu/stampede/.

R. Caruana and A. Niculescu-Mizii, "An empirical comparison of supervised learning algorithms," in Proceedings of the 23rd international conference on Machine learning , 2006, pp. 161-168.

D. C. Ciresan, U. Meier, L. M. Gambardella, and J. Schmidhuber, "Deep, big, simple neural nets for handwritten digit recognition," Neural Comput. , vol. 22, No. 12, pp. 3207-3220, 2010.

X. Glorot and Y. Benglo, "Understanding the difficulty of training deep feedforward neural networks," in International Conference on Artificial Intelligence and Statistics , 2010, pp. 249-256.

Y. Bengio, "Learning deep architectures for AI," Found. Trends® Mach. Learn., vol. 2, No. 1, pp. 1-127, 2009.

D. C. Ciresan, U. Meier, and J. Schmidhuber, "Transfer learning for Latin and Chinese characters with deep neural networks," in Neural Networks (IJCNN), The 2012 International Joint Conference on, 2012, pp. 1-6.

Yangoing, Jia, et al., "Caffee—Deep Learning Framework by the BVLC," [Online]. Available: http://caffe.berkeleyvision.org/tutorial/layers.html, 17 pgs.

Keller, John, "DARPA TRACE program using advanced algorithms, embedded computing for radar target recognition," Jul. 24, 2015 [Online]. Available http://www.militaryaerospace.com/articles/2015/07/hpec-radar-target-recognition.html, 3 pgs.

Fatica, Massimiliano, et al., "Synthetic Aperture Radar imaging on a CUDA-enabied mobile platform," IEEE, 2014, 5 pgs.

Cui, Zongyong, et al., "Hierarchical Recognition System for Target Recognition from Sparse Representations," Mathematical Problems in Engineering, vol. 2015, Article ID527095, 7 pgs.

Clemente, Carmine, et al., "Processing of synthetic Aperture Radar data with GPGPU," IEEE Xplore Abstract, Oct. 7, 2009. [Online]. Available: http://ieeexplore.ieee.org/xpl/articieDetails.jsp?reload=true&arnumber=5336272, 2 pgs.

Xie, Huiming, et al., "Multilayer feature learning for polarimetric synthetic radar data classification," IEEE Xplore Abstract, Jul. 13, 2014. [Online]. Available: http://ieeexplore.ieee.org/xpl/articleDetails.jsp?arnumber=6947062, 2 pgs.

Xu, Hui, et al., "A new algorithm of SAR target recognition based on advance deep learning neural network," Computer Modelling & New Technologies, vol. 18, No. 12A, 2014, pp. 25-30.

Morgan, David A.E., "Deep convolutional neural networks for ATR from SAR imagery," SPIE Proceedings, May 13, 2015, 2 pgs.

Gong, Maoguo, et al., "Multi-objective Sparse Feature Learning Model for Deep Neural Networks," IEEE Transactions on Neural Networks and Learning Systems, vol. 26, No. 12, Dec. 2015, pp. 3263-3277.

"GeForce GTX TITAN | Specifications | GeForce." [Online]. Available: http://www.geforce.com/hardware/desktop-gpus/geforce-gtx-titan/specifications.

"CUDA Performance—Nvidia GeForce GTX 780 Review: Titan's Baby Brother Is Born." [Online]. Available: http://www.tomshardware.com/reviews/geforce-gtx-780-performance-review,3516-26.html.

"Deep Learning." [Online]. Available: http://www.cs.toronto.edu/~rsalakhu/isbi.html.

R. Salakhutdinov, J. Tenenbaum, and A. Torralba, "One-shot learning with a hierarchical nonparametric bayesian model," 2010.

"AWS for US Federal Government." [Online]. Available: http://aws.amazon.com/federal/.

L. Wan, M. Zeiler, S. Zhang, Y. L. Cun, and R. Fergus, "Regularization of neural networks using dropconnect," in Proceedings of the 30th International Conference on Machine Learning (ICML-13), 2013, pp. 1058-1066.

I. J. Goodfellow, D. Warde-Farley, P. Lamblin, V. Dumoulin, M. Mirza, R. Pascanu, J. Bergstra, F. Bastien, and Y. Bengio, "Pylearn2: a machine learning research library," ArXiv Prepr. ArXiv13084214, 2013.

Simonyan & Zisserman, "Very Deep Convolutional Networks for Large-Scale Image Recognition," ICLR 2015.

J.C. Duchi, E. Hazan, and Y. Singer, "Adaptive Subgradient Methods for Online Learning and Stochastic Optimization," Journal of Machine Learning Research, 2011.

Adadelta, as in Zeiler, M. D., "Adadelta: An Adaptive Learning Rate Method," CoRR, abs/1212.5701, 2012).

A. Hannun, C. Case, J. Casper, B. Catanzaro, G. Diamos, E. Elsen, R. Prenger, S. Satheesh, S. Sengupta, A. Coates, and A. Y. Ng, "Deep Speech: Scaling Up End-To-End Speech Recognition," CoRR, abs/1412.5567, 2014).

Le, Q., Ranzato, M., Monga, R., Devin, M., Chen, K., Corrado, G., Dean, J., and Ng, A., "Building High-Level Features Using Large Scale Unsupervised Learning," ICML, 2012).

V. Nair and G. E. Hinton, "Rectified linear units improve restricted Boltzmann machines," In Proc. 27th International Conference on Machine Learning, 2010.

G. Hinton, O. Vinyals, and J. Dean, "Distilling the Knowledge in a Neural Network," Neural Information Processing Systems: Workshop Deep Learning and Representation Learning Workshop, 2014.

M. Zeiler, R. Fergus, "Stochastic Pooling for Regularization of Deep Convolutional Neural Networks," ArXiv Prepr.ArXiv1301.3557v1 Jan. 16, 2013.

C. Szegedy, W. Liu, Y. Jia, P. Sermanet, S. Reed, D. Anguelov, D. Erhan, V. Vanhoucke, A. Rabinovich, "Going Deeper With Convolutions," ArXiv Prepr. ArXiv1409.4842v1, Sep. 17, 2014.

S. Wager, W. Wang, P. Liang, "Dropout Training as Adaptive Regularization.".

C. Szegedy, A. Toshev, D. Erhan, "Deep Neural Networks for Object Detection.".

DARPA Broad Agency Announcement "Target Recognition and Adaption in Contested Environments (TRACE)," Strategy Technology Office, DARPA-BAA-15-09, Dec. 1, 2014.

(56) References Cited

OTHER PUBLICATIONS

L. Deng, D. Yu, "Deep Learning Methods and Applications," Foundations and Trends in Signal Processing, vol. 7:3-4.

* cited by examiner

SYSTEMS AND METHODS FOR RECOGNIZING OBJECTS IN RADAR IMAGERY

CROSS-REFERENCE TO RELATED APPLICATIONS

This application claims priority under 35 U.S.C. § 119(e) to U.S. Provisional Patent Application No. 62/025,075, entitled "A Method for Fast and Accurate Recognition of Objects in Radar Imagery," filed Jul. 16, 2014.

FIELD OF THE INVENTION

Embodiments of the present invention relate to systems and methods for improving the automated recognition of objects from flying vehicles using radar imagery and related onboard image processing techniques. More particularly, embodiments of the present invention relate to systems and methods for utilizing deep learning algorithms, onboard pipelined processing architectures, and improvements in portable computing systems to improve automated onboard recognition of objects within synthetic aperture radar signals obtained from flying vehicles.

BACKGROUND

The general problem of computerized object detection in images has been studied for decades, and many techniques are known in the art. Although the entire field of object recognition ("OR") has experienced some recent advances, OR algorithms have historically suffered less than adequate performance in correctly identifying objects in visual imagery streams, especially with respect to radar imagery. In addition, OR algorithms have historically required significant computational resources, such as high performance computing ("HPC") clusters, which have significant space and power requirements, as compared to small size, weight, and power ("SWAP") technologies.

In part because of their space and power requirements, whenever OR algorithms have been applied to imagery obtained from devices installed in airborne vehicles (including space-borne vehicles), the OR algorithms have been hosted largely on ground stations. In these applications, images gathered by airborne vehicles have been transmitted to the ground stations via a high-speed wireless downlink. On the ground stations, OR algorithms running on HPC clusters have been employed to identify specific objects in the gathered imagery. Once identified, information describing the identified objects has been communicated from the ground stations back to the airborne vehicles for use in determining specific actions to take with respect to the identified objects. Such architectures have obvious limitations, including: (1) a distributed wireless communications architecture with inherent delays and reliability problems; (2) a ground station with logistics, security, and cost concerns; (3) expensive HPC technology; and (4) expensive manpower required to operate the ground-based devices.

Although different object recognition algorithms can operate on information obtained from different kinds of sensors, most successes in the field of object recognition have been achieved from algorithms that accept data from sensors that employ passive electro-optical ("EO") technology. Passive electro-optical sensors are relatively common and most can be fielded on very small handheld devices. They are typically a passive imaging modality that can be found in photo and video cameras, motion sensors, and similar devices that convert incoherent light into electronic signals.

Object recognition algorithms that operate on data obtained from electro-optical sensors have traditionally employed a variety of techniques to recognize objects. These techniques are well known in the art and include: edge detection, corner detection, gray-scale matching, gradient matching, pose clustering, feature detection, feature comparison, scale-invariant feature transforms, domain-specific image descriptors and many others.

In contrast to passive, electro-optical ("EO") image sensing technologies that convert incoherent light into electronic signals, synthetic aperture radar ("SAR") is (for example, in spotlight mode SAR imaging) a coherent, side-looking radar system that utilizes the flight path of a flying platform to electronically simulate an extremely large antenna or aperture, and thereby obtain high-resolution imagery by illuminating objects with interrogating radar signals. The imagery is generated from a series of radio wave pulses that are transmitted to "illuminate" a target scene, and the echo of each pulse is received and recorded by sensors. The pulses are transmitted and the echoes received (typically) by a single beam-forming antenna, with typical wavelengths of one meter to millimeters. Multiple transmitters and receivers (as in multistatic radar) are also possible. As a SAR device moves on a flying vehicle, the antenna locations relative to a target change over time. Signal processing of the recorded radar echoes allows a SAR device to combine recordings from the multiple antenna locations. The multiple antenna locations together form a synthetic antenna aperture, which allows the device to create a finer resolution image than would be possible with a given physical antenna aperture.

Although the noise statistics of SAR images have historically prevented OR algorithms on SAR imagery from equaling the performance of OR algorithms on EO imagery, SAR imagery has several advantages over electro-optical imagery, especially in the context of object detection and identification, and especially for flying platforms. SAR imaging platforms can visualize objects through clouds, operate at night, at greater distances, and can perform better in certain applications, such as timber assessment, law enforcement, and air traffic monitoring.

However, efforts to apply object recognition (OR) algorithms to SAR imagery have historically been relatively unsuccessful. Algorithms and techniques that have worked well for passive, incoherent EO imagery have not proved as effective for active, coherent SAR imagery. For example, researchers developing object recognition algorithms for SAR imaging data have not been able to successfully incorporate feature detectors like Harris corner detectors and Plessy corner detectors, or feature descriptors like scale-invariant feature transforms ("SIFT") and Speeded Up Robust Features ("SURF").

Researchers have also been relatively unsuccessful at utilizing deep learning techniques to identify objects within data obtained from active and coherent radiation devices, such as synthetic aperture radar. Thus, there has been a significant performance gap in object recognition algorithms that operate on passive, incoherent, electro-optical ("EO") imagery versus active, coherent, SAR imagery, with OR performance on EO imagery typically outperforming OR performance on SAR imagery by a wide margin, even using the same OR algorithms. The OR performance compromise is so great and teaches away from OR on SAR imagery to such a degree that historically, alternative sensors to SAR (like EO sensors) are typically considered more appropriate for tasks that would otherwise be a good fit for SAR imaging, due to the inapplicability of most OR methods to SAR imaging.

Owing to this performance gap, instead of attempting to address deficiencies in object recognition performance on SAR sensor imagery, the conventional approach has been to use an EO imaging sensor (or other sensor or combination of sensors) and incorporate traditional EO object recognition techniques in OR (i.e., target identification) applications. That is, it was considered more economically advantageous to "fix the sensor" (by substituting EO sensors where SAR sensors might be more appropriate) than to fix the OR algorithms operating on SAR imagery. Deployed systems have still exploited SAR imaging for related tasks, for which OR algorithms do provide some benefit, but have used EO technology for more difficult object recognition tasks. Such architectures were adopted despite the fact that EO sensors need to observe objects from closer range to achieve the requisite accuracy.

SUMMARY OF THE INVENTION

In recent years, deep learning technology has emerged as a powerful machine-learning model for object recognition problems. Deep learning is a branch of machine learning that attempts to model high-level abstractions of data (e.g., objects) by transforming raw data (e.g., a photograph) into successive layers of abstractions using non-linear transformations between each layer. Various deep learning architectures such as deep neural networks, deep convolutional neural networks, and deep belief networks have been investigated and found to be useful in fields like computer vision, automatic speech recognition, natural language processing, audio recognition and bioinformatics. Some deep learning architectures have been inspired by advances in neuroscience and are loosely based on interpretations of information processing and communication patterns in a nervous system, such as neural coding, which attempts to define a relationship between a stimulus and subsequent neuronal responses observed among affected neurons. Many variations of deep learning techniques are known in the art.

Deep learning techniques for EO image analysis may consist of four (4) key phases: (1) the deep architecture design (i.e., choosing the types and numbers of inputs and outputs, types and number of layers, types of nonlinearities, and types of pooling, among other design choices, typically in a convolutional neural net); (2) training strategy design (i.e., tuning of optimization algorithm hyper-parameters, including learning rate, momentum, dropout rate by layer, etc.), (3) a supervised learning phase where the parameters of a deep architecture are tuned to produce, as reliably as possible, the correct label for each training sample; and (4) a deployment phase where a deep architecture is applied to previously unseen images to assign a probabilistic weighting to the labels observed in training. Deep learning techniques can be cascaded, with the outputs of one deep architecture being inputs to another, for instance. Deep learning techniques like convolutional neural networks have been applied to incoherent, passive, EO imagery with success, but have not been successfully applied to coherent, active sensing modalities like SAR.

Embodiments of the present invention are directed to providing innovative advances to object recognition algorithms for SAR sensors on airborne vehicles. Specifically, embodiments of the invention receive a data stream from SAR sensors and use a deep neural network ("DNN") to convert the received data into a set of semantic labels, where each semantic label corresponds to an object in the SAR data stream that the DNN has identified. Processing units running the DNN are collocated onboard an airborne vehicle along with the SAR sensor(s). The processing units are configured with powerful, high-speed graphics processing units ("GPUs") or field-programmable gate arrays ("FPGAs") that are low in size, weight, and power requirements.

Embodiments of the invention are also directed to providing innovative advances to object recognition training systems that utilize a detector and an object recognition cascade (a "cascade") to analyze SAR image streams in real time. The analysis can take place in stages. In a first stage, at least one detector can receive an unlabeled stream of image patches and separate the stream into at least two streams: a background stream of image patches and a non-background stream of image patches. An image patch, also called a "SAR chip" or simply a "chip," is a small image patch within (or extracted from) a larger SAR image. While large SAR images may extend over regions containing many different semantic labels, including trees, roads, grass, vehicles, and buildings in a single image, a chip is more typically associated with a single semantic label (such as "motorcycle") or a hierarchy of labels, (such as "motorcycle," "vehicle," and "non-background").

An object recognition cascade can comprise at least one recognizer that receives the non-background stream of image patches from a detector and automatically assigns one or more semantic labels to each non-background image patch. In some embodiments, a separate recognizer for the background analysis of patches may also be incorporated. There may be multiple detectors and multiple recognizers, depending on the design of the cascade.

Embodiments of the invention utilize deep learning techniques to train object recognition algorithms (e.g., cascades) that run on the onboard processing units. Embodiments also include novel methods to tailor deep neural network algorithms to successfully process SAR imagery, utilizing techniques such as normalization, sampling, data augmentation, foveation, cascade architectures, and label harmonization. In these embodiments, label harmonization can include deduplication and hierarchical mapping of semantic labels. For example, in a three stage cascade, a detector may first detect an image patch with a motorcycle as "non-background." The image patch may then be provided to a recognizer, which may recognize the image patch as simply "vehicle." Finally, the image patch may be provided to yet another recognizer, which may recognize the image patch as "motorcycle." The novel methods of tailoring DNN algorithms to SAR imagery significantly improve historical speed and accuracy performance limitations of prior OR algorithms for SAR devices. The high performance, low power GPU and/or FPGA technologies significantly improve results previously obtained from OR algorithms operating onboard flying platforms, enabling a high performance cascade to be fielded on a flying platform. Collocating SAR sensors with OR algorithm computational hardware onboard flying platforms eliminates a need for a communications link between ground stations and flying platforms (both manned and unmanned) for automated object recognition. The use of SAR technology for object detection also allows flying sensors to "see through" objects like clouds, which can occlude passive EO sensors, and allows flying sensors to "see at night" and allows flying sensors to "see from greater distances." Compact SAR sensors enable even smaller flying vehicles to use embodiments of the invention in place of or to augment existing EO sensor and processing streams.

Embodiments of the present invention enable new and improved performance of tasks that are often dangerous, dirty, or dull. Such applications include at least the following: (1) Recognizing and tracking vehicle makes and models in a dense, cluttered urban scene by coordinating flights of multiple autonomous drones, as can be helpful for law enforcement purposes, for example; (2) Estimating water content or other forest stand health metrics on wooded areas, for purposes of planning forest thinning schedules or forest stand valuation, for example; (3) Improving drone-to-drone or drone-to-commercial flying vehicle communication for path planning and situational awareness, both in recognizing common reference points on the ground as well as recognizing other flying vehicles where radio frequency ("RF") communication is limited (for example, due to traffic, weather, jamming, component failure, sabotage, etc.); (4) Improving standoff distance compared to EO or other sensors (LIDAR, LADAR, audio, etc.) to protect flying vehicles from interference while performing surveillance operations (for instance, to improve survivability against targeting by criminals); (5) Assessing localized roadway traffic patterns (for example, on commuter routes); (6) Assisting in navigation; (7) Assisting in mine detection; and (8) Assisting in automated patrol of large uncontrolled border crossing areas, such as the border between Canada and the US and/or the border between Mexico and the US. Those skilled in the art will recognize additional applications of this technology to solve similar problems. The above list of applications is not intended to limit the use of embodiments of the present invention, but only serve as examples of their commercial use.

The above summaries of embodiments of the present invention have been provided to introduce certain concepts that are further described below in the Detailed Description. The summarized embodiments are not necessarily representative of the claimed subject matter, nor do they limit or span the scope of features described in more detail below. They simply serve as an introduction to the subject matter of the various inventions.

BRIEF DESCRIPTION OF THE DRAWINGS

So the manner in which the above recited summary features of the present invention can be understood in detail, a more particular description of the invention may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DESCRIPTION OF THE EMBODIMENTS

Embodiments of the present invention will be described with reference to the accompanying drawings, wherein like parts are designated by like reference numerals throughout, and wherein the leftmost digit of each reference number refers to the drawing number of the figure in which the referenced part first appears.

Overview of the Embodiments

Figure 1:
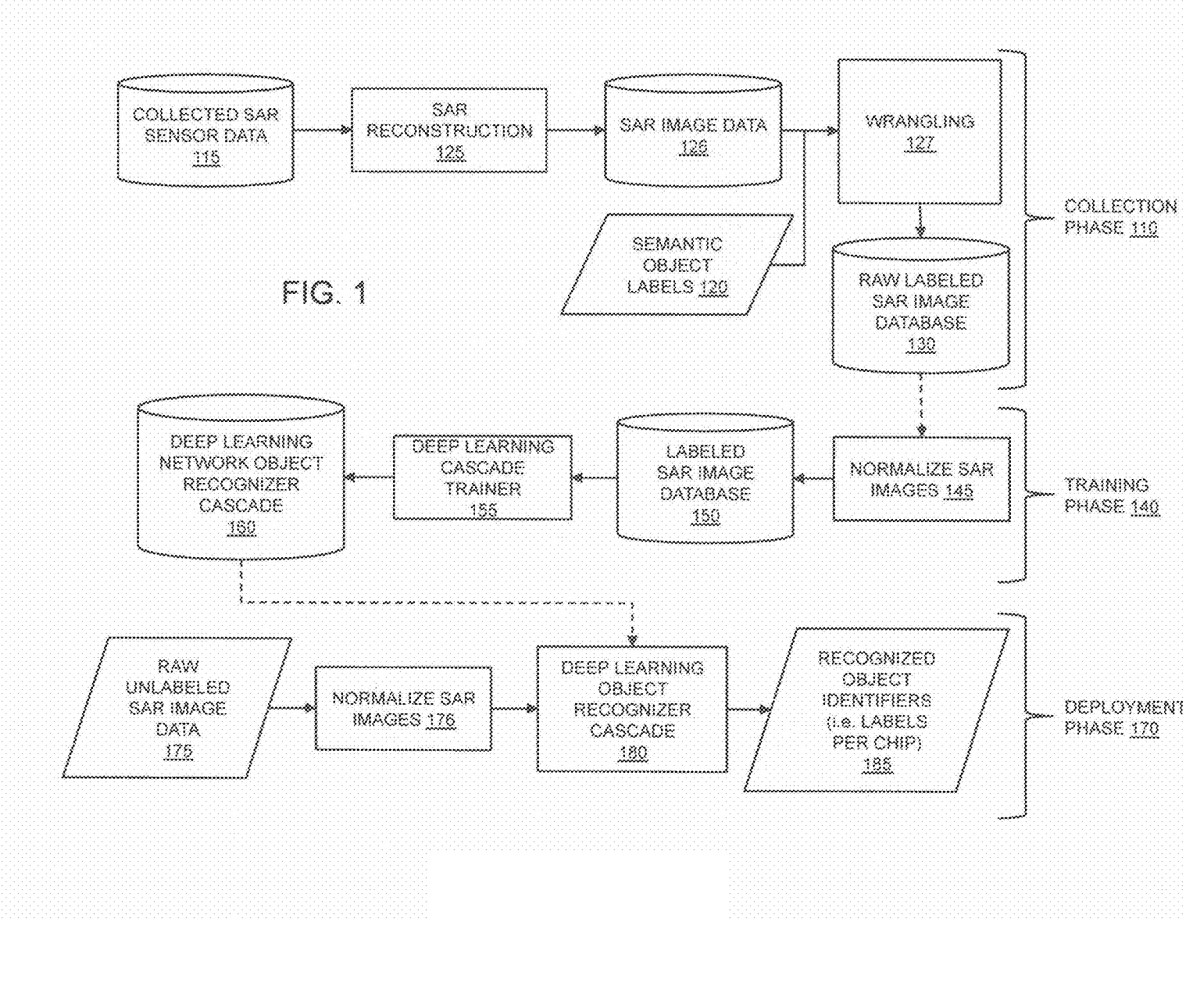
FIG. 1 illustrates an exemplary embodiment of a process for collecting SAR imagery, training a deep learning network, and deploying a trained deep learning network to recognize objects within SAR images, in accordance with the present disclosure.

FIG. 1 illustrates an exemplary embodiment of a system-level process for collecting SAR imagery, training a deep learning network, and deploying a trained deep learning network to recognize objects within SAR (synthetic aperture radar) images, in accordance with the present disclosure. The process comprises three phases: a Collection Phase 110, a Training Phase 140, and a Deployment Phase 170.

In Collect Phase 110, embodiments of the present invention can receive Collected SAR Sensor Data 115 and Semantic Object Labels 120, and based on those inputs, produce a Raw Labeled SAR Image Database 130 suitable for training an object recognition system to identify certain objects. Embodiments of the present invention do not use a dedicated algorithm mapped to a specific dedicated hardware platform to generate the Raw Labeled SAR Image Database 130. Rather, embodiments use a deep learning network running on a general-purpose programmable SWAP platform that employs a high-speed graphics processing unit or field-programmable gate array device. In addition, image data (such as Collected SAR Sensor Data 115) may not be saved in intermediate form, but may simply be "piped" to a next stage over a bus, cable, wireless signal or other information channel without storage.

In Train Phase 140, embodiments of the present invention can analyze the data in Raw Labeled SAR Image Database 130 to train a deep learning network to recognize specific objects. At Step 145, the raw labeled SAR image data from Raw Labeled SAR Image Database 130 can be normalized for training a deep learning network. The normalized SAR images can then be loaded into a Labeled SAR Image Database 150, which can then be provided to a Deep Learning Cascade Trainer 155 to train a Deep Learning Network Object Recognizer Cascade 160 to recognize objects associated with the contents (i.e. labels) of the Labeled SAR Image Database 150.

In Deploy Phase 170, the Deep Learning Network Object Recognizer Cascade 160 can be imported into the typically smaller SWAP deployment hardware that runs the Deep Learning Object Recognizer Cascade 180 to create a deployed system that can recognize objects within yet-to-be acquired raw SAR data. Thus, when Raw Unlabeled SAR Image Data 175 are normalized via Normalize SAR Images 176 to generate SAR image chips and are provided as input to Deep Learning Object Recognizer Cascade 180, the deep learning cascade can generate Recognized Object Identifiers 185 (i.e., labels as defined in the Labeled SAR Image Database 150) corresponding to each input SAR image chip.

SAR Data Collection

Still referring to FIG. 1, Collection Phase 110 can include a sensing process and a labeling process. The sensing process often begins with at least one controlled data-gathering mission of a flying platform over a defined geographic area. The data-gathering flight can collect large, raw, un-annotated SAR phase histories of interrogating waveforms prior to image formation. The phase histories are usually attributed with GPS coordinates. The GPS coordinates can be obtained by a number of methods, including: (1) entering the coordinates manually; (2) estimating the coordinates using fiducials (an object placed in the field of view of an imaging system which appears in the image produced, for use as a point of reference or a measure); (3) estimating the coordinates with a positioning device such as a GPS (global positioning system), an IMU (inertial measurement unit), or a gimbal or other avionics device that can provide acquisition geometry; and (4) other methods known in the art.

The output of the raw sensing process is typically a large amount of time-stamped coherent Collected SAR Sensor Data 115 (including the phase histories). The interrogating SAR waveforms may include pulses, chirps, wavelet-based signals, pseudo-noise-based signals, or combinations with varying pulse widths, regular or irregular repeat triggers, varying power, and may be monopolar, bipolar, quad-pol or a combination. This data is reconstructed into 2D images through the SAR Reconstruction 125. Reconstruction typically produces large time-stamped geo-referenced SAR Image Data 126, which can include at least magnitude and phase information. The SAR Reconstruction may alter the input SAR data by accounting for Doppler effects, other superimposed radar signals (by estimating or measuring and subtracting them out, for instance), and may be a polarimetric reconstruction, tomographic reconstruction or a combination. The large SAR images in SAR Image Data 126 typically contain within them a plurality of representative examples of objects that will eventually receive semantic labels, such as grass, trees, vehicles, buildings, or even more specific semantic labels, such as motorcycles within a hierarchical class of vehicles. Individual objects (such as vehicles) in the SAR images can be time-stamped and geolocated (to a point or 2D or 3D region) within the reconstructed SAR Image Data 126, providing a means to combine georeferenced Semantic Object Labels 120 with the output georeferenced SAR Image Data 126, either automatically or manually.

The process by which individual image patches ("SAR chips") within SAR Image Data 126 are paired with Semantic Object Labels 120 semantic labels is Wrangling 127. The input to Wrangling 127 can be a set of time stamped and georeferenced Semantic Object Labels 120 and corresponding time stamped and georeferenced SAR Image Data 126. Image patches corresponding to a particular semantic label can be mapped (i.e., wrangled) in various ways for different reasons and to achieve different results. One way of wrangling labels into image chips is to crop a fixed width image from a large SAR image by selecting a fixed area around a central point corresponding to a sensed GPS location for each semantic label. This process can be repeated for all GPS locations within a large georeferenced SAR image, creating many labeled SAR image chips per collected SAR image. In other cases, georeferenced images may contain or may intersect with corresponding geographic regions (for example, a shape file from a Geographic Information System database). Georeferenced images may be sampled from such regions in various ways. For instance, a random sampling may be effected by selecting ordered (x, y) pairs corresponding to pixels in the large image, and then crop a fixed width SAR image about each of the selected (x, y) pairs, creating a unique labeled SAR image chip. The sampling can be made to be random, non-overlapping, and with or without replacement, depending on the desired training strategy. The SAR image chips cropped from the large SAR Image Data 126 are typically all of the same dimensions (i.e., image sizes), but larger or smaller image chips may also be created. The output of the Wrangling 127 process is a collection of raw, labeled SAR images that can be stored in Raw Labeled SAR Image Database 130. RAW SAR Image Database 130 comprises a collection of observed SAR image chips tagged with their corresponding semantic labels (e.g., truck, tank, building, human, etc.).

Some common other methods for constructing a Raw Labeled SAR Image Database 130 include labeling and cropping images by hand, assigning labels to SAR image chips via crowdsourcing (through Amazon's Mechanical Turk, for example), or a semi-automated process by which an automated detector is used in conjunction with a labeling process (like Amazon Mechanical Turk) to prompt users for labels per detected SAR image chip.

As part of the Wrangling 127 process, Semantic Object Labels 120 that are associated with SAR image patches stored in the Raw Labeled SAR Image Database 130 may be organized hierarchically (as part of an ontology, for instance), or may be organized according to various object recognition objectives. For instance, SAR image chips may be attributed with multiple semantic labels of different types. In the case of a background SAR image chip, it may be attributed with the label "background" only, for instance, or attributed with the label "background," in addition to a type of background, such as "road," "grass," or "tree." In the case of a vehicle, for instance, an image chip may be attributed with the labels "non background," "vehicle," and "motorcycle."

Though more generally applicable to all active imaging technologies, embodiments of the present invention are described in terms of SAR imaging technologies. In SAR, a radar sensor is nominally a SAR sensor capable of creating imagery from a plurality of radar returns directed to a specific area on the ground, typically by operating the radar in spotlight-mode, strip mode, or push-broom mode. The principle of SAR imaging is to acquire radar data as if it were acquired from a much larger radar sensor, thereby "synthesizing" a large aperture by receiving data from a plurality of locations on the flight path rather than from a single large radar sensor. The band of the radar for the applications described (recognizing metal objects on the ground) is most typically X-band, but K-band, P-band or other bands may be appropriate, depending on application. The received signals are then processed into imagery on board an aircraft through dedicated signal processing technologies, such as methods based on tomographic reconstruction or polarimetric reconstruction. The sensor may image the same location in repetition, providing a plurality of images of the same location (or the same object(s)) from different views for downstream recognition or understanding.

Collecting SAR Sensor Data

Figure 2:
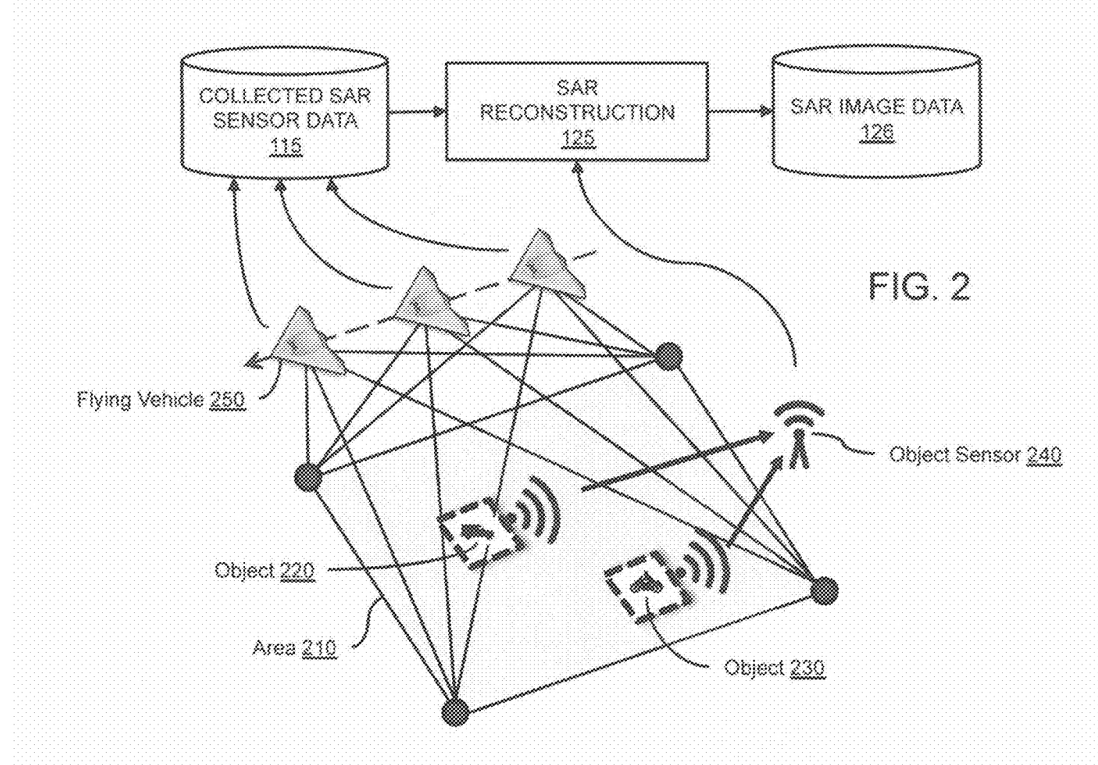
FIG. 2 illustrates an exemplary embodiment of a process for collecting SAR sensor data, in accordance with the present disclosure.

FIG. 2 illustrates an exemplary embodiment of a process for collecting SAR sensor data, in accordance with the present disclosure. The process may begin by placing or identifying known objects in a geographic Area 210 corresponding to a known SAR field of view. Area 210 can be an arbitrary size, for example 1 km×1 km, and may be defined by geographic coordinates or other techniques known in the art. Each object to be trained (i.e., associated with a semantic label), for example Object 220 and/or Object 230, may be placed or identified in Area 210 and may be configured with a transmitter that can transmit an identifier, a semantic label, and/or time-stamped GPS coordinate information about the object. The transmitted information can be received by Object Sensor 240 and then relayed to SAR Reconstruction 270 for integration into SAR Image Database 280. Alternatively, maps of known object types may be overlaid for other semantic labels.

Once the training objects (e.g., Object 220 and/or Object 230 and/or regions) are placed or identified in the SAR field of view within Area 210, a Flying Vehicle 250 can then fly over Area 210 and collect data from an on-board SAR device (not shown). The onboard SAR device can operate in spotlight mode, strip mode, push-broom mode, or any other mode known in the art to create SAR images suitable for object detection and/or recognition.

Flying Vehicle 250 may be a manned or unmanned flying vehicle, such as a drone. Flying Vehicle 250 may be a conventional or vertical take off or land (VTOL) vehicle. Flying Vehicle 250 may be small (minimally requiring a payload capable of carrying the sensor and processing hardware) or large. Flying Vehicle 250 may be battery-operated, or powered by a combustion engine (such as gas-powered internal combustion engine) or any other form of engine known by persons skilled in the art to be suitable for use in a flying vehicle.

As Flying Vehicle 250 flies over Area 210, it may collect data from an on-board SAR device. The collected SAR data can be uploaded or otherwise saved into a database of Collected SAR Sensor Data 115 (see also, FIG. 1). Once the SAR data is collected into Collected SAR Sensor Data 115, the data can be processed in a SAR Reconstruction 125 operation, to produce time-stamped geo-referenced SAR Image Data 126.

The resulting SAR Image Data 126 can support both "detector" training and "object recognizer" training, providing necessary training data for a detector/object recognizer cascade. A detector might only assign a label of "background" or "non-background" to every chip in a SAR image. These chips can be stitched into a map of detections in a larger map, for instance. On the other hand, an object recognizer will typically assign a likelihood of a range of semantic labels according to the evidence in each image supporting the assignment of a particular label to each SAR image chip.

Normalizing SAR Images

Returning to FIG. 1, embodiments of the present invention can use raw SAR image information to train a deep learning network at Train Phase 140 to recognize objects. At Step 145, the raw SAR image data received from Raw Labeled SAR Image Database 130 can be normalized for training a deep learning network.

Images can be normalized by: (1) identifying the central band of each chip aligned with the axis of illumination of the SAR imaging system casting a "shadow" (since SAR images are actively illuminated, objects cast a shadow where the object occludes the interrogating SAR radar pulse); (2) excluding detected shadow regions from image chips; (3) dividing all pixel values in a SAR image chip by an order statistic (such as the median or other percentile of image magnitude data in the edge vertical band ("EVB") region of a chip; (4) using techniques that are known in the art for normalizing EO imagery and/or photographic imagery; and/or (5) dividing all chip pixel values by the standard deviation of pixels comprising the 10-90 percentiles in the EVB, rather than the standard deviation of the entire image, thereby eliminating or reducing object-specific image differences due to coherent scatterers and shadow. For instance, SAR images can have bright spots and scatterers, which can bias more standard EO-appropriate normalization techniques (such as mean subtraction and division by the standard deviation of all pixels). The approach taken by embodiments of the present invention avoids corrupting normalization with either the shadow or bright scatterers because it only considers pixels in the EVB. Normalization by more standard mean subtraction and variance normalization (i.e., the standard conversion of image chips to their corresponding z-values) is standard and effective with EO imagery, but does not result in reliable object recognition with SAR imagery.

Training the Deep Learning Network

Still referring to FIG. 1, after images are normalized and loaded into Labeled SAR Image Database 150, a Deep Learning Cascade Trainer 155 may then perform a series of configuration and training steps to train a deep learning network to recognize objects found in the Labeled SAR Image Database 150. The Deep Learning Cascade Trainer 155 can select and transform appropriate SAR image data for a particular task from among all semantically labeled SAR training chips. For instance, to train a "detector," the Deep Learning Cascade Trainer 155 module can process all SAR image chips and associated semantic labels found in Labeled SAR Image Database 150, and convert them either to a general "object of interest" label (that is, an "object of interest" may abstract a plurality of object labels into a single generic object label) or a "background" label, thus configuring a deep learning network for a binary detection task. In the case of an object recognizer, however, chips labeled as "background" by a detector stage may be excluded (or included as their own class), and all or some of the plurality of semantic labels may be preserved for training, depending on the object recognition task.

Nominally, a task may be defined as the ultimate mapping of input images to labels. In a "detection" task, for example, the labels may be only "background" or "non-background." In an object recognition task, there may be a more complex labeling and images may exit the cascade at various stages. For instance, as an output of a "detector" stage of the cascade, "background" image chips may be output as a direct result of that stage, whereas "non-background" image chips may be sent on to the next stage (nominally a recognizer stage). As an output of the recognizer stage of the cascade, all "not background" image chips may be further categorized into labels such as "vehicle," "building," or "road." Within a "vehicle" label, for instance, image chips may be further categorized into "motorcycles," "trucks," and "cars." Tasks are ultimately defined by the requirements of the application or user. Tasks are often optimized jointly (as in the case where the false alarm rate and detection rate of detector are optimized jointly with the ultimate downstream recognizer(s) performance), but can also be optimized independently based on detection and recognition performance separately.

There are many ways to train a deep learning architecture. One training recipe available to Deep Learning Cascade Trainer 155 may be the one described by Krizhevsky, Sutskever, & Hinton, "ImageNet Classification with Deep Convolutional Neural Networks," NIPS 2012, utilizing back-propagation with size 128 mini-batches randomly drawn from labeled examples, cycling through all mini-batches and repeating in a stochastic gradient descent ("SGD") framework. Nominally, this framework would use both a constant step size (i.e., how much to perturb weights in the direction of the negative error gradient) and momentum (i.e., it averages the "gradient direction" over the last n steps of stochastic gradient descent, incorporating more of the most recent "gradient directions" via momentum). As an option, momentum can be ignored.

In addition to the methods disclosed above, Deep Learning Cascade Trainer 155 can train a deep learning architecture on observed and labeled SAR image chips by employing one or more of the following techniques:

1. A Neural Network with More than Three Layers

Embodiments of the invention can use a neural net with more than 3 layers, including a "base deep architecture" such as the "VGG" network as described in Simonyan & Zisserman, "Very Deep Convolutional Networks for Large-Scale Image Recognition," ICLR 2015. For purposes of the disclosed embodiments, a deep architecture can be a function incorporating at least 3 layers, each of which may be taken from any of the following types of layers: (1) "convolutional", (2) "locally connected", (3) one incorporating the "inception module" method, (4) "fully connected", (5) "softmax", (6) "pooling" and/or (7) any combination of these and other widely used layer types, as well as in other open source resources implementing similar deep architectures. Note that every layer in a deep architecture will have an input and an output and will convert the inputs to the outputs according to the function(s) selected for that layer. Each layer can incorporate nonlinear transformations, such as pooling or common nonlinear transformations, such as ReLU or sigmoids.

Normally, a deep learning architecture (i.e., its layers and functions) will be specified before training begins, but it may be refined by observing the results of training. For example, the error rate on a task may be computed after training a deep architecture that specifies 4 convolutional layers with max pooling, 3 locally connected layers, 2 fully connected layers and a softmax layer (with all except the softmax layer using ReLU nonlinearities, for example). The same training may be run a number of times with different results, due to, for instance, all of at least a partially random initialization of weights, a randomization in the sequence of training examples, or other randomly generated nuances of training, such as a random element in the reduction of the step sizes during training. The average error over all these training runs may be computed on a held out test data set. The results on this architecture may be compared to other architectures that are similarly trained. Another experimental architecture might incorporate more layers of various types, re-sequence the layers, incorporate more units in particular layers, or some combination. If the same Monte Carlo training of object recognition algorithms perform, on average, better than a different "base" deep architecture specification, the "base" architecture may be abandoned (or incorporated through other methods—such as distillation), and the experimental architecture may be used instead. Or a hybrid of multiple architectures may be computed.

2. Back-Propagation and Stochastic Gradient Descent

Embodiments of the invention can use a deep learning architecture that is trained with back-propagation and/or stochastic gradient descent algorithms, including (A) a back-propagation algorithm with hyperparameters; (B) a stochastic gradient descent framework; and/or (C) a parallel training strategy.

Back-Propagation With Hyperparameters. A back-propagation algorithm with hyperparameters (i.e., a parameter that governs the process of searching the deep architecture parameter space for a parameterization that minimizes some objective) is one where the parameters are tuned empirically, uses adaptive step sizes (such as adagrad, as in J. C. Duchi, E. Hazan, and Y. Singer, "Adaptive Subgradient Methods For Online Learning And Stochastic Optimization," Journal of Machine Learning Research, 2011; and/or ADADELTA, as in Zeiler, M. D., "ADADELTA: An Adaptive Learning Rate Method," CoRR, abs/1212.5701, 2012), and/or includes adaptive momentum.

The same way that different "experimental" architectures can be tested under different conditions (i.e., different deep architecture specifications), different "experimental" training recipes that alter the step size, momentum, or other training hyperparameter according to some process. For instance, a parallel grid search on step sizes can be conducted for all architectures and used, for instance, to either (1) reduce the amount of training time or computation to reach a particular error rate or (2) reach an ultimately lower error rate. Such an empirical tuning is not limited to the step size, and can be conducted according to a predefined program that specifies the initial hyperparameters and experiments with various other choices for hyperparameters and selects the hyperparameters that best optimize for a proximate or ultimate training objective (e.g., a time/computation to reach a specified training objective or the ultimate value of the training objective or a combination of both).

As a stochastic gradient descent ("SGD") algorithm progresses with a constant step size, the error may fluctuate from minibatch to minibatch about some mean error that generally decreases over epochs. Typically, SGD with a large step size can quickly reduce the training error, but a large step size may not efficiently explore the fine distinctions among details of the weights that parameterize a deep architecture, leading to a relatively high error rate. On the other hand, SGD with a small step size often takes a long time to converge to the error reached by the training recipe that used the larger step size. One way to manage these practical difficulties is to train in successive stages, first with a large step size, then a smaller step size, and then finer and finer step sizes until no further improvement is possible. Continuous schedules that gradually reduce the step size (akin to an "annealing" schedule) are also possible. Recently, automated approaches to schedule step sizes that are both fast and responsive to asymptotic behavior (such as adagrad and adadelta as examples) have been introduced. In general, these methods gradually reduce the step size based on the recent training history. When the error rate plateaus, the step size can be incrementally reduced.

The same way the step size can be estimated empirically, and made to respond to the rate at which the error rate falls for a particular training recipe, the momentum can also be made to increase or decrease (i.e., be adaptive) in response to improve the error rate decrease as a function of training epoch.

Stochastic Gradient Descent Framework. A stochastic gradient descent framework incorporates sequencing of training examples that provide training for incrementally more challenging classification tasks as training progresses (as in curriculum learning approaches). In stochastic gradient descent training, examples in each minibatch are typically randomly sampled without regard to an object recognizer's labeling performance on each image patch. However, it is known that if the easiest training examples are presented first in training, and more difficult examples incorporated through judicious selection of incrementally more difficult training examples per minibatch in future training epochs, the deep architecture can typically reach a better error rate than if all training examples were presented in a purely random sequence. This is called "curriculum learning."

Parallel Training Strategy. A parallel training strategy is one that may incorporate data parallelism (as in A. Hannun, C. Case, J. Casper, B. Catanzaro, G. Diamos, E. Eisen, R. Prenger, S. Satheesh, S. Sengupta, A. Coates, and A. Y. Ng, "Deep Speech: Scaling Up End-To-End Speech Recognition," CoRR, abs/1412.5567, 2014), model parallelism (as in Le, Q., Ranzato, M., Monga, R., Devin, M., Chen, K., Corrado, G., Dean, J., and Ng, A., "Building High-Level Features Using Large Scale Unsupervised Learning," ICML, 2012), or both.

3. ReLU Nonlinearities

Embodiments of the invention can use a deep learning architecture with hidden units that exploit rectified linear unit (ReLU) nonlinearities, as in V. Nair and G. E. Hinton, "Rectified linear units improve restricted Boltzmann machines," In Proc. 27th International Conference on Machine Learning, 2010.

4. Convolutional, Locally Connected, and/or Fully Connected Layers

Embodiments of the invention can use a deep learning architecture that includes a convolutional layer, a locally connected layer, and/or a fully connected layer. A convolutional layer that convolves the input image with a set of learnable filters, each one producing one feature map in the output image. A locally connected layer with unshared weights. This kind of layer is just like a convolutional layer, but without any weight sharing. That is to say, a different set of filters is applied at every (x, y) location in the input image. Aside from that, it behaves exactly as a convolutional layer. A fully connected layer (also known as an InnerProduct layer) that treats its inputs as a simple vector and produces an output in the form of a single vector (with the blob's height and width set to 1).

5. Regularization Techniques

Embodiments of the invention can use a deep learning architecture that includes regularization techniques in training, such as dropout and stochastic pooling. Dropout (or the similar dropconnect technique) is a training method where for each training example (or similarly, a training mini-batch), a random portion of the deep architecture is disconnected (as described in Hinton, Srivastava, Krizhevsky, Sutskever, and Salakhutdinov, "Improving neural networks by preventing co-adaptation of feature detectors," 2012) and thereby reduces overfitting phenomena. Dropout is typically incorporated only in fully connected layers. Stochastic pooling is an adaptation of the dropout method to convolutional layers that replaces the conventional deterministic pooling operations with a stochastic procedure, randomly picking the activation within each pooling region according to a multinomial distribution, given by the activities within the pooling region. The approach is hyper-parameter free and can be combined with other regularization approaches, such as dropout and data augmentation.

6. Trained with Soft Targets

Embodiments of the invention can use a deep learning architecture that is trained with "soft targets," where output labels of previously trained large architectures (trained with "one-hot" semantic labels, for instance) can be used as continuous-valued "label vectors" for training of a "distilled" architecture, according to techniques known in the art as in G. Hinton, O. Vinyals, and J. Dean, "Distilling the Knowledge in a Neural Network," Neural Information Processing Systems: Workshop Deep Learning and Representation Learning Workshop, 2014. With respect to FIG. 1, for example, Deep Learning Object Recognizer Cascade 180 may be a distilled architecture that is trained using soft targets found in Deep Learning Network Object Recognizer Cascade 160.

Deploying a DNN Object Recognizer

Returning again to FIG. 1, in Deploy Phase 170, a Deep Learning Network Object Recognizer Cascade 160 can be imported into Deep Learning Object Recognizer Cascade 180 to create a deployed system that can recognize objects within yet-to-be acquired Raw Unlabeled SAR Image Data 175. As discussed above, Deep Learning Object Recognizer Cascade 180 may be a distilled architecture that is trained using soft targets found in Deep Learning Network Object Recognizer Cascade 160.

In operation, Deep Learning Object Recognizer Cascade 180 may be deployed on a flying vehicle such as Flying Vehicle 250 (see FIG. 2). The flying vehicle may be equipped with an on-board SAR device. As the flying vehicle flies over a target geographic area, the onboard SAR device can operate in spotlight mode, strip mode, pushbroom mode, or any other mode known in the art to create Raw Unlabeled SAR Image Data 175 suitable for object detection and/or recognition.

The collected Raw Unlabeled SAR Image Data 175 can be normalized on-board the flying vehicle via a Normalize SAR Images 176 process to generate normalized SAR image chips for recognition. The normalized SAR image chips can then be provided as input to Deep Learning Object Recognizer Cascade 180, which can then generate Recognized Object Identifiers 185 (i.e., labels as defined in the Labeled SAR Image Database 150) corresponding to each of the input normalized SAR image chips.

Figure 3:
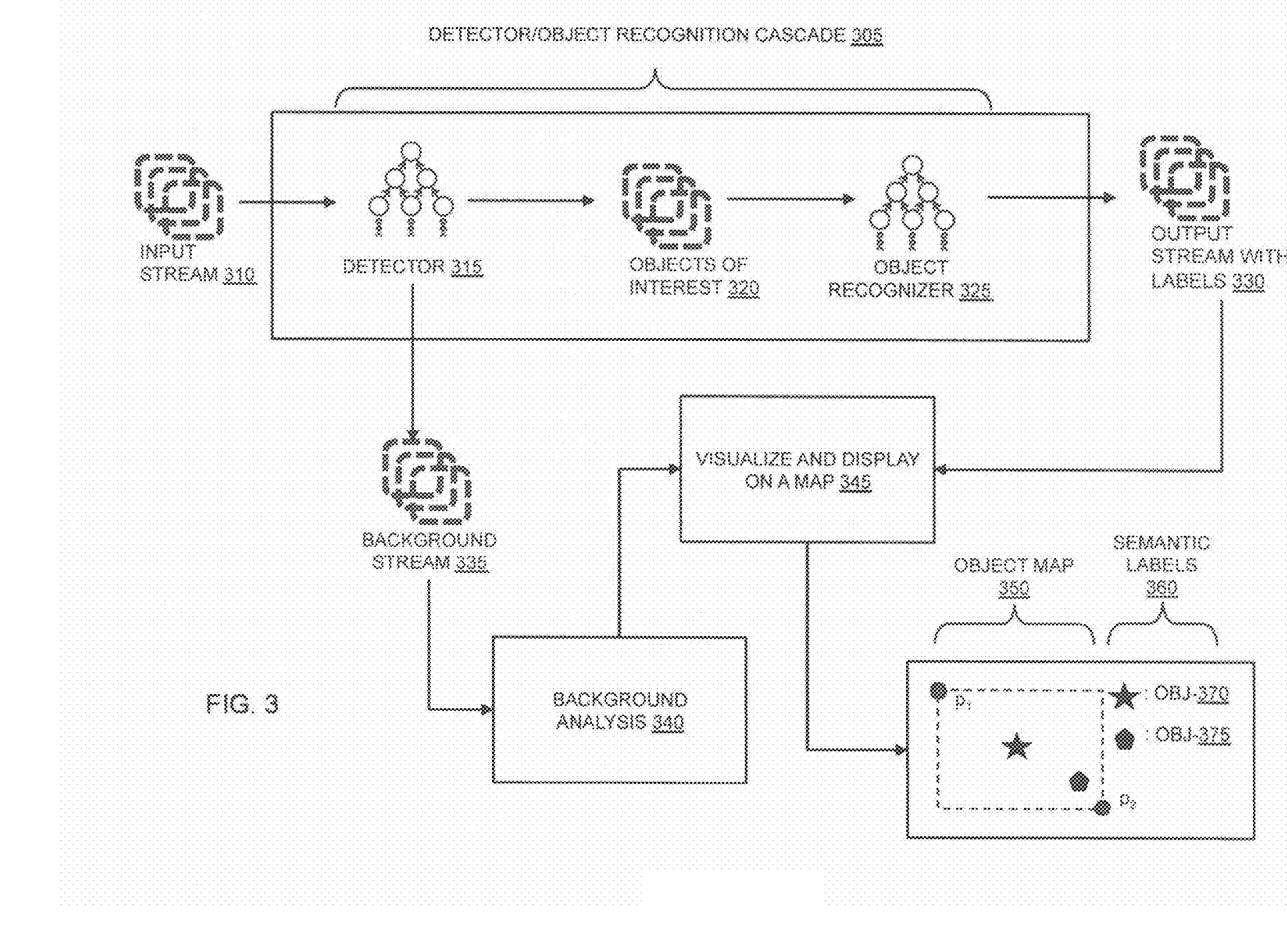
FIG. 3 illustrates an exemplary embodiment of a process for utilizing a detector and an object recognition cascade in a deployed system to analyze SAR image streams in real time.

FIG. 3 illustrates an exemplary embodiment of a process for utilizing a detector and an object recognition cascade (such as Deep Learning Object Recognizer Cascade 180 in FIG. 1) in a deployed system to analyze SAR image streams in real time. The analysis can take place in stages and may operate on-board a flying vehicle such as Flying Vehicle 250 (FIG. 2). In a first stage, at least one Detector 315 can receive an unlabeled Input Stream 310 of image patches and separate the stream into at least two streams: a Background Stream 335 of image patches and a non-background stream of image patches reflecting Objects of Interest 320. The Input Stream 310 of image patches can correspond to SAR Image Data 126 (FIG. 2).

A Detector/Object Recognition Cascade 305 can comprise at least one Object Recognizer 325 that receives a non-background stream of image patches reflecting Objects of Interest 320 from Detector 315 and, using a previously trained DNN (such as Deep Learning Object Recognizer Cascade 180 in FIG. 1) automatically assign one or more semantic labels to each non-background image patch, thereby producing an Output Stream with Labels 330 for each Object of Interest 320 that has been recognized. In some embodiments, a separate recognizer for a Background Analysis 340 of the Background Stream 335 of image patches may also be incorporated. Embodiments may use more than one Detector 315 and/or more than one Object Recognizer 325, depending on the design of the Detector/Object Recognition Cascade 305.

Some embodiments may also employ a downstream process to Visualize and Display on a Map 345 the Background Stream 335 of image patches recognized by Background Analysis 340 together with the Output Stream with Labels 330 generated by Object Recognizer 325. The resulting Object Map 350 may display recognized objects (for example, Objects 370 and 375) on a map (the area defined by geographic locations $p_1$ and $p_2$, for example), along with the Semantic Labels 360 corresponding to Objects 370 and 375 (shown in FIG. 3 as a star icon and a pentagon icon, respectively).

Figure 4:
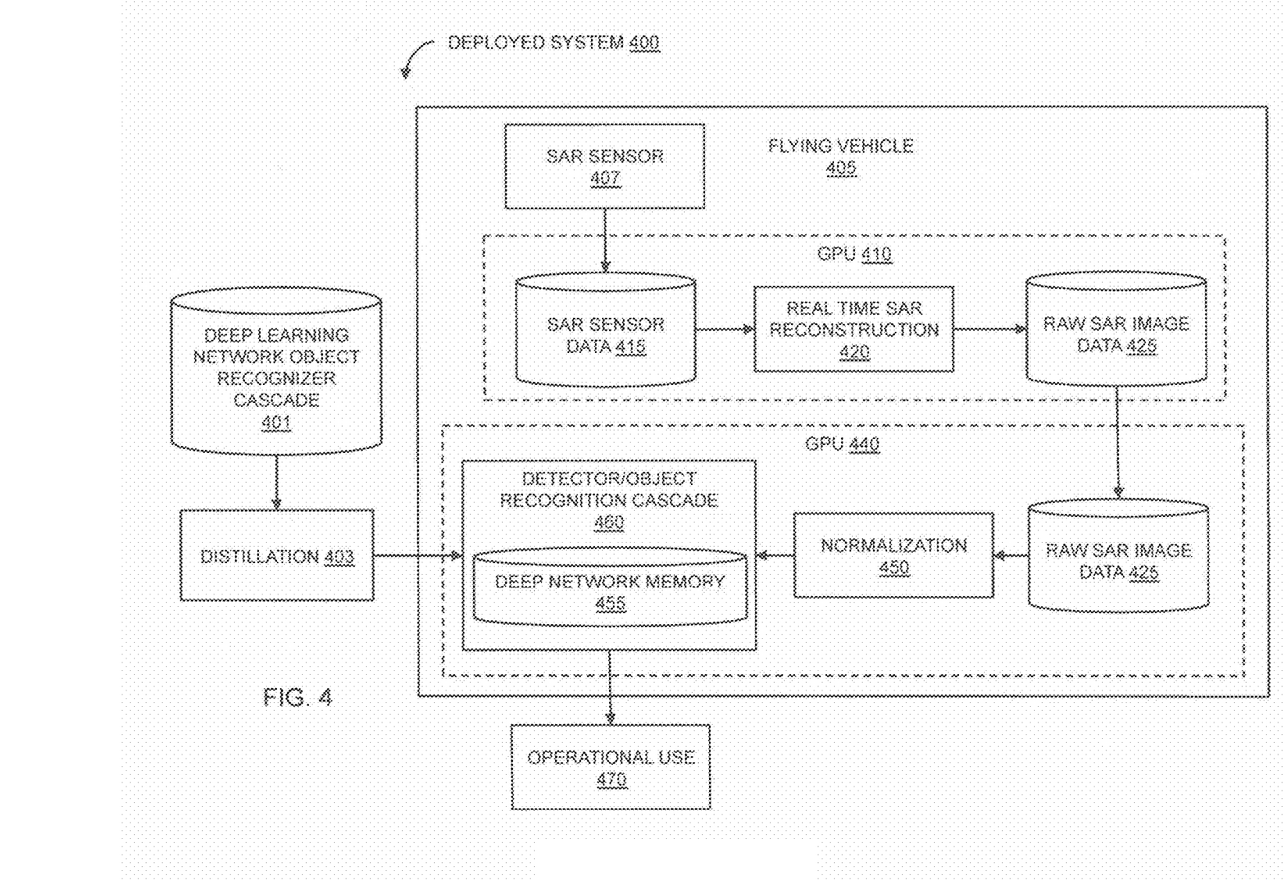
FIG. 4 illustrates an exemplary embodiment of a deployed system for collecting SAR images and for using a trained deep learning network to recognize objects within the collected SAR images, in accordance with the present disclosure.

FIG. 4 illustrates an exemplary embodiment of a Deployed System 400 for collecting SAR images and for using a trained deep learning network to recognize objects within the collected SAR images, in accordance with the present disclosure. Deployed System 400 may comprise a Flying Vehicle 405, which may be configured with one or more high-speed graphics processing units ("GPUs"), shown in FIG. 4 as GPU 410 and GPU 440. GPU 410 and GPU 440 may optionally comprise the same physical unit. GPU 410 and/or GPU 440 may also comprise a field-programmable gate array, in addition to or instead of a graphics processing unit. Flying Vehicle 405 may be identical to Flying Vehicle 250 (FIG. 2).

GPU 410 and/or GPU 440 may each comprise a computing device such as a Tegra X1 processor from NVIDIA, or equivalent. GPU 410 and/or GPU 440 may each include memory units. The memory units may include SAR Sensor Data Memory 415, Raw SAR Image Data Memory 425, and/or Deep Network Memory 455. Each of the memory units may comprise any number of different physical memory devices or they together may comprise a single memory device. Any memory device may be a shared memory.

All computational and memory units onboard Flying Vehicle 405 may be ruggedized to withstand extreme thermal and vibrational conditions and also to isolate them from electromagnetic interference ("EMI"). All memory units onboard Flying Vehicle 405 may also comprise small footprint, low power storage devices, such as miniaturized solid-state drives ("SSDs"). Additionally, the size, number, and power requirements of circuit boards comprising GPU 410 and/or GPU 440 and their component memory units may be minimized, subject to performance requirements.

Deployed System 400 may be configured for a specific objective comprising either an object detector or an object recognizer. To initialize Deployed System 400 for operation, a Deep Learning Network Object Recognizer Cascade 160 may be loaded into the Deep Network Memory 455 of Detector/Object Recognition Cascade 460. The deployed Detector/Object Recognition Cascade 460 may be an identical copy of the trained Deep Learning Network Object Recognizer Cascade 160, but it may also be a "distilled" version of the Deep Learning Network Object Recognizer Cascade 160. For example, Deployed System 400 may incorporate a Distillation 403 step, which may use output label probabilities as labels in training a cascade with similar output probabilities, but for typically smaller architectures. This can allow nominally similar input image/output label probability behavior of a deployed Detector/Object Recognition Cascade 460, but at greatly reduced memory footprint and computation, as would accommodate the typically smaller resources found in the SWAP technologies utilized in GPU 410 and/or GPU 440.

In the techniques described above for using a Deep Learning Cascade Trainer 155 to create a Deep Learning Network Object Recognizer Cascade 160, the training hardware may include a GPU-enabled workstation. That is, training need not be done in the air. Moreover, it can take from hours to weeks to complete the training, depending on empirical requirements of resulting Deep Learning Network Object Recognizer Cascade 160. Typically, a detector will be optimized for an exceedingly low false alarm ("FA") rate (but tolerating more frequent misses) and very fast execution speed in a small memory footprint, and the object recognizer will be optimized for an exceedingly high classification accuracy at relatively slower processing speeds (due to typically larger and more complex network architectures) and larger memory footprints, providing high accuracy and speed in the cascade, with exceedingly low false alarm rates.

The various hardware configurations of Deployed System 400 may constrain the training procedures. That is, the deep learning network architectures may be constrained so that the maximum size of a particular object recognizer cascade can be realized within the Deployed System 400, and particularly within the size constraints of Deep Network Memory 455 and the processing constraints of GPU 410 and/or GPU 440.

Continuing with FIG. 4, Flying Vehicle 405 (which may be identical to the Flying Vehicle 250 of FIG. 2) may fly a prescribed trajectory over a given target area such as, for example, Area 210 (FIG. 2), and the SAR Sensor 407 onboard Flying Vehicle 405 may use GPU 410 to collect SAR Sensor Data 415 from SAR Sensor 407 and then perform a Real Time SAR Reconstruction Process 420 on the collected SAR Sensor Data 415 to generate SAR Image Data 425. The SAR Sensor used to generate SAR Image Data 126 (FIGS. 1, 2) is the same SAR Sensor 407 used by Deployed System 400 to generate Raw SAR Image Data 425 during deployment, but in deployment, a Real Time Reconstruction 420 process on board the Flying Vehicle 405 (i.e., an aircraft—manned or unmanned—and the collected data is not streamed to a ground station) may operate on a small SWAP HPC system, such as an FPGA or GPU-based device 410 to generate the Raw SAR Image Data 425. The Raw SAR Image Data 425 may then stream to another small SWAP HPC system, such as an FPGA or GPU-based device 440, which may or may not be different from GPU 410.

The Raw SAR Image Data 425 may include raw time-stamped SAR imagery and geolocated SAR image coordinates for the ground plane. The Raw SAR Image Data 425 may then be normalized into chips during Normalization 450 in the same manner that the original training images were normalized during Normalize SAR Images 145. The normalized chips can then be processed by the Detector/Object Recognition Cascade 460 onboard Flying Vehicle 405 and residing on Deep Network Memory 455 of GPU 440. The output of the Detector/Object Recognition Cascade 460 can be a computer readable set of images that can be or have already been paired with semantic labels, which may then be provided to an Operational Use 470 control module, where the semantic labels corresponding to recognized objects can be used by a number of operational applications, including surveillance, logging etc.

Benefits of the Embodiments

Rather than transmit and receive EO images to and from a ground station where objects in the EO images may be recognized using dedicated hardware running rule-based and/or feature-engineered object recognition algorithms, embodiments of the invention may instead employ onboard computational hardware on a flying vehicle to recognize objects within SAR imagery utilizing a deep learning object recognizer cascade.

Embodiments of the present invention may recognize objects within SAR imagery, not with a dedicated algorithm mapped to a specific dedicated hardware platform, but instead mapped to a general purpose, ruggedized, programmable, small SWAP HPC platform (as on a GPU or FPGA, for example) running a deep learning algorithm that is the result of software programming.

In particular, embodiments of the present invention may utilize a deep learning algorithm to detect objects by processing SAR imagery rather than EO imagery. Embodiments may also utilize a deep learning algorithm to recognize objects by processing SAR imagery rather than EO imagery, including methods tuned to improve the performance of object recognition from SAR image streams, including the accumulation of multi-view evidence for recognized objects.

Embodiments of the present invention may employ object detection and recognition algorithms that are not rule-based or feature-engineered, but instead utilize a machine learning approach that learns features from many observations of objects. That is, the deep learning approach of the embodiments can learn the features of desired objects instead of having those features engineered by hand.

Computing Device

Figure 5:
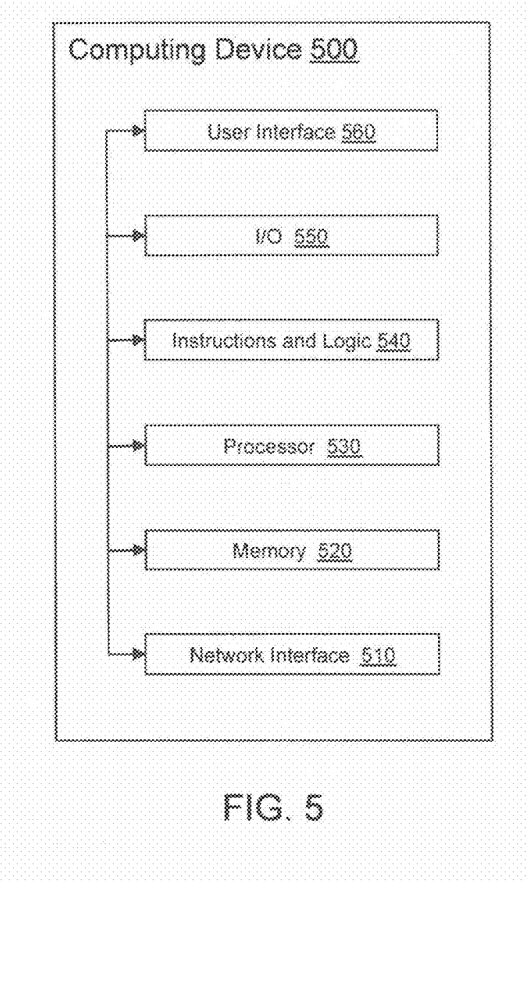
FIG. 5 is a block diagram of an exemplary embodiment of a computing device, in accordance with the present invention.

FIG. 5 is a block diagram of an exemplary embodiment of a Computing Device 500 in accordance with the present invention, which in certain operative embodiments can comprise, for example, GPU 410 and GPU 440 of FIG. 4. Computing Device 500 can comprise any of numerous components, such as for example, one or more Network Interfaces 510, one or more Memories 520, one or more Processors 530, program Instructions and Logic 540, one or more Input/Output ("I/O") Devices 550, and one or more User Interfaces 560 that may be coupled to the I/O Device(s) 550, etc.

Computing Device 500 may comprise any device known in the art that is capable of processing data and/or information, such as any general purpose and/or special purpose computer, including as a personal computer, workstation, server, minicomputer, mainframe, supercomputer, computer terminal, laptop, tablet computer (such as an iPad), wearable computer, mobile terminal, Bluetooth device, communicator, smart phone (such as an iPhone, Android device, or BlackBerry), a programmed microprocessor or microcontroller and/or peripheral integrated circuit elements, a high speed graphics processing unit, an ASIC or other integrated circuit, a hardware electronic logic circuit such as a discrete element circuit, and/or a programmable logic device such as a PLD, PLA, FPGA, or PAL, or the like, etc. In general, any device on which a finite state machine resides that is capable of implementing at least a portion of the methods, structures, API, and/or interfaces described herein may comprise Computing Device 500. Such a Computing Device 500 can comprise components such as one or more Network Interfaces 510, one or more Processors 530, one or more Memories 520 containing Instructions and Logic 540, one or more Input/Output (I/O) Devices 550, and one or more User Interfaces 560 coupled to the I/O Devices 550, etc.

Memory 520 can be any type of apparatus known in the art that is capable of storing analog or digital information, such as instructions and/or data. Examples include a non-volatile memory, volatile memory, Random Access Memory, RAM, Read Only Memory, ROM, flash memory, magnetic media, hard disk, solid state drive, floppy disk, magnetic tape, optical media, optical disk, compact disk, CD, digital versatile disk, DVD, and/or RAID array, etc. The memory device can be coupled to a processor and/or can store instructions adapted to be executed by processor, such as according to an embodiment disclosed herein.

Input/Output (I/O) Device 550 may comprise any sensory-oriented input and/or output device known in the art, such as an audio, visual, haptic, olfactory, and/or taste-oriented device, including, for example, a monitor, display, projector, overhead display, keyboard, keypad, mouse, trackball, joystick, gamepad, wheel, touchpad, touch panel, pointing device, microphone, speaker, video camera, camera, scanner, printer, vibrator, tactile simulator, and/or tactile pad, optionally including a communications port for communication with other components in Computing Device 500.

Instructions and Logic 540 may comprise directions adapted to cause a machine, such as Computing Device 500, to perform one or more particular activities, operations, or functions. The directions, which can sometimes comprise an entity called a "kernel", "operating system", "program", "application", "utility", "subroutine", "script", "macro", "file", "project", "module", "library", "class", "object", or "Application Programming Interface," etc., can be embodied as machine code, source code, object code, compiled code, assembled code, interpretable code, and/or executable code, etc., in hardware, firmware, and/or software. Instructions and Logic 540 may reside in Processor 530 and/or Memory 520.

Network Interface 510 may comprise any device, system, or subsystem capable of coupling an information device to a network. For example, Network Interface 510 can comprise a telephone, cellular phone, cellular modem, telephone data modem, fax modem, wireless transceiver, Ethernet circuit, cable modem, digital subscriber line interface, bridge, hub, router, or other similar device.

Processor 530 may comprise a device and/or set of machine-readable instructions for performing one or more predetermined tasks. A processor can comprise any one or a combination of hardware, firmware, and/or software. A processor can utilize mechanical, pneumatic, hydraulic, electrical, magnetic, optical, informational, chemical, and/or biological principles, signals, and/or inputs to perform the task(s). In certain embodiments, a processor can act upon information by manipulating, analyzing, modifying, converting, transmitting the information for use by an executable procedure and/or an information device, and/or routing the information to an output device. A processor can function as a central processing unit, local controller, remote controller, parallel controller, and/or distributed controller, etc. Unless stated otherwise, the processor can comprise a general-purpose computing device, including a microcontroller and/or a microprocessor, such as a Tegra X1 processor from NVIDIA. In certain embodiments, the processor can be dedicated purpose device, such as an Application Specific Integrated Circuit (ASIC), a high speed Graphics Processing Unit (GPU) or a Field Programmable Gate Array (FPGA) that has been designed to implement in its hardware and/or firmware at least a part of an embodiment disclosed herein.

User Interface 560 may comprise any device and/or means for rendering information to a user and/or requesting information from the user. User Interface 560 may include, for example, at least one of textual, graphical, audio, video, animation, and/or haptic elements. A textual element can be provided, for example, by a printer, monitor, display, projector, etc. A graphical element can be provided, for example, via a monitor, display, projector, and/or visual indication device, such as a light, flag, beacon, etc. An audio element can be provided, for example, via a speaker, microphone, and/or other sound generating and/or receiving device. A video element or animation element can be provided, for example, via a monitor, display, projector, and/or other visual device. A haptic element can be provided, for example, via a very low frequency speaker, vibrator, tactile stimulator, tactile pad, simulator, keyboard, keypad, mouse, trackball, joystick, gamepad, wheel, touchpad, touch panel, pointing device, and/or other haptic device, etc. A user interface can include one or more textual elements such as, for example, one or more letters, number, symbols, etc. A user interface can include one or more graphical elements such as, for example, an image, photograph, drawing, icon, window, title bar, panel, sheet, tab, drawer, matrix, table, form, calendar, outline view, frame, dialog box, static text, text box, list, pick list, pop-up list, pull-down list, menu, tool bar, dock, check box, radio button, hyperlink, browser, button, control, palette, preview panel, color wheel, dial, slider, scroll bar, cursor, status bar, stepper, and/or progress indicator, etc. A textual and/or graphical element can be used for selecting, programming, adjusting, changing, specifying, etc. an appearance, background color, background style, border style, border thickness, foreground color, font, font style, font size, alignment, line spacing, indent, maximum data length, validation, query, cursor type, pointer type, auto-sizing, position, and/or dimension, etc. A user interface can include one or more audio elements such as, for example, a volume control, pitch control, speed control, voice selector, and/or one or more elements for controlling audio play, speed, pause, fast forward, reverse, etc. A user interface can include one or more video elements such as, for example, elements controlling video play, speed, pause, fast forward, reverse, zoom-in, zoom-out, rotate, and/or tilt, etc. A user interface can include one or more animation elements such as, for example, elements controlling animation play, pause, fast forward, reverse, zoom-in, zoom-out, rotate, tilt, color, intensity, speed, frequency, appearance, etc. A user interface can include one or more haptic elements such as, for example, elements utilizing tactile stimulus, force, pressure, vibration, motion, displacement, temperature, etc.

The present invention can be realized in hardware, software, or a combination of hardware and software. The invention can be realized in a centralized fashion in one computer system, or in a distributed fashion where different elements are spread across several computer systems. Any kind of computer system or other apparatus adapted for carrying out the methods described herein is suitable. A typical combination of hardware and software can be a general-purpose computer system with a computer program that, when being loaded and executed, controls the computer system such that it carries out the methods described herein.

Although the present disclosure provides certain embodiments and applications, other embodiments apparent to those of ordinary skill in the art, including embodiments that do not provide all of the features and advantages set forth herein, are also within the scope of this disclosure.

The present invention, as already noted, can be embedded in a computer program product, such as a computer-readable storage medium or device which when loaded into a computer system is able to carry out the different methods described herein. "Computer program" in the present context means any expression, in any language, code or notation, of a set of instructions intended to cause a system having an information processing capability to perform a particular function either directly or indirectly after either or both of the following: a) conversion to another language, code or notation; or b) reproduction in a different material form.

The foregoing disclosure has been set forth merely to illustrate the invention and is not intended to be limiting. It will be appreciated that modifications, variations and additional embodiments are covered by the above teachings and within the purview of the appended claims without departing from the spirit and intended scope of the invention. Other logic may also be provided as part of the exemplary embodiments but are not included here so as not to obfuscate the present invention. Since modifications of the disclosed embodiments incorporating the spirit and substance of the invention may occur to persons skilled in the art, the invention should be construed to include everything within the scope of the appended claims and equivalents thereof.

The invention claimed is:

1. A system for assembling a database of labeled radar image chips for object recognition, comprising:
   a flying vehicle;
   a synthetic aperture radar device onboard the flying vehicle,
     the synthetic aperture radar device configured to receive a stream of radio wave signals reflected from a target scene; and
   a processor onboard the flying vehicle,
     the processor configured to process the stream of radio wave signals received by the synthetic aperture radar device into a plurality of two-dimensional radar image chips, each chip including a set of pixels comprising magnitude and phase information derived from the received radio wave signals,
     the processor further configured to wrangle at least one of a set of semantic labels from each of the plurality of two-dimensional radar image chips, each semantic label corresponding to an object in the target scene, and
     the processor further configured to generate a database of labeled radar image chips as a result of the wrangling.

* * * * *